US011623282B2

(12) United States Patent
Nordkvist et al.

(10) Patent No.: US 11,623,282 B2
(45) Date of Patent: *Apr. 11, 2023

(54) ADDITIVE MANUFACTURING OF THREE-DIMENSIONAL ARTICLES

(71) Applicant: Arcam AB, Moelndal (SE)

(72) Inventors: Johan Nordkvist, Vaestra Froelunda (SE); Ulf Ackelid, Goeteborg (SE)

(73) Assignee: Arcam AB, Moelndal (SE)

( * ) Notice: Subject to any disclaimer, the term of this patent is extended or adjusted under 35 U.S.C. 154(b) by 548 days.

This patent is subject to a terminal disclaimer.

(21) Appl. No.: 16/797,159

(22) Filed: Feb. 21, 2020

(65) Prior Publication Data
US 2020/0282459 A1    Sep. 10, 2020

Related U.S. Application Data

(62) Division of application No. 15/344,732, filed on Nov. 7, 2016, now Pat. No. 10,610,930.
(Continued)

(51) Int. Cl.
*B22F 12/00* (2021.01)
*B33Y 50/02* (2015.01)
(Continued)

(52) U.S. Cl.
CPC ............ *B22F 12/00* (2021.01); *B22F 3/1017* (2013.01); *B23K 15/0086* (2013.01);
(Continued)

(58) Field of Classification Search
CPC ........ B22F 12/00; B22F 3/1017; B22F 10/10; B22F 12/41; B22F 12/45; B22F 2998/10;
(Continued)

(56) References Cited

U.S. PATENT DOCUMENTS 2,264,968 A    12/1941  De Forest
2,323,715 A     7/1943  Kuehni
(Continued)

FOREIGN PATENT DOCUMENTS

CA        2860188 A1     6/2006
CN      101607311 A    12/2009
(Continued)

OTHER PUBLICATIONS

European Extended Search Report for EP Application No. 20171746.9 dated Jul. 13, 2020 (11 pages).
(Continued)

*Primary Examiner* — Michael J Brown
(74) *Attorney, Agent, or Firm* — Dinsmore & Shohl LLP

(57) ABSTRACT

The present invention relates to a methods, computer program products, program elements, and apparatuses for forming a three-dimensional article through successively depositing individual layers of powder material that are fused together so as to form the article. The method comprising the steps of providing at least one electron beam source emitting an electron beam for at least one of heating or fusing the powder material, where the electron beam source comprises a cathode and an anode, and varying an accelerator voltage between the cathode and the anode between at least a first and second predetermined value during the forming of the three-dimensional article.

20 Claims, 9 Drawing Sheets

Related U.S. Application Data

(60) Provisional application No. 62/257,060, filed on Nov. 18, 2015.

(51) Int. Cl.
*B29C 64/153* (2017.01)
*B29C 64/386* (2017.01)
*B33Y 10/00* (2015.01)
*B33Y 30/00* (2015.01)
*B22F 3/10* (2006.01)
*B23K 15/00* (2006.01)
*B23K 15/02* (2006.01)
*B22F 10/10* (2021.01)
*B22F 12/45* (2021.01)
*B22F 12/41* (2021.01)

(52) U.S. Cl.
CPC ............ *B23K 15/02* (2013.01); *B29C 64/153* (2017.08); *B29C 64/386* (2017.08); *B33Y 10/00* (2014.12); *B33Y 30/00* (2014.12); *B33Y 50/02* (2014.12); *B22F 10/10* (2021.01); *B22F 12/41* (2021.01); *B22F 12/45* (2021.01); *B22F 2998/10* (2013.01); *B22F 2999/00* (2013.01); *Y02P 10/25* (2015.11)

(58) Field of Classification Search
CPC .... B22F 2999/00; B22F 10/364; B22F 10/28; B22F 10/36; B22F 12/55; B23K 15/0086; B23K 15/02; B29C 64/153; B29C 64/386; B29C 64/393; B33Y 10/00; B33Y 30/00; B33Y 50/02; Y02P 10/25
USPC .......................................................... 425/78
See application file for complete search history.

(56) References Cited

U.S. PATENT DOCUMENTS

| | | |
|---|---|---|
| 3,634,644 A | 1/1972 | Ogden et al. |
| 3,838,496 A | 10/1974 | Kelly |
| 3,882,477 A | 5/1975 | Mueller |
| 3,906,229 A | 9/1975 | Demeester et al. |
| 3,908,124 A | 9/1975 | Rose |
| 4,314,134 A | 2/1982 | Schumacher et al. |
| 4,348,576 A | 9/1982 | Anderl et al. |
| 4,352,565 A | 10/1982 | Rowe et al. |
| 4,401,719 A | 8/1983 | Kobayashi et al. |
| 4,541,055 A | 9/1985 | Wolfe et al. |
| 4,651,002 A | 3/1987 | Anno |
| 4,818,562 A | 4/1989 | Arcella et al. |
| 4,863,538 A | 9/1989 | Deckard |
| 4,888,490 A | 12/1989 | Bass et al. |
| 4,927,992 A | 5/1990 | Whitlow et al. |
| 4,958,431 A | 9/1990 | Clark et al. |
| 4,988,844 A | 1/1991 | Dietrich et al. |
| 5,118,192 A | 6/1992 | Chen et al. |
| 5,135,695 A | 8/1992 | Marcus |
| 5,167,989 A | 12/1992 | Dudek et al. |
| 5,182,170 A | 1/1993 | Marcus et al. |
| 5,204,055 A | 4/1993 | Sachs et al. |
| 5,247,560 A | 9/1993 | Hosokawa et al. |
| 5,393,482 A | 2/1995 | Benda et al. |
| 5,483,036 A | 1/1996 | Giedt et al. |
| 5,508,489 A | 4/1996 | Benda et al. |
| 5,511,103 A | 4/1996 | Hasegawa |
| 5,595,670 A | 1/1997 | Mombo |
| 5,637,052 A | 6/1997 | Hirota et al. |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,204,469 B1 | 3/2001 | Fields et al. |
| 6,419,203 B1 | 7/2002 | Dang |
| 6,537,052 B1 | 3/2003 | Adler |
| 6,554,600 B1 | 4/2003 | Hofmann et al. |
| 6,583,379 B1 | 6/2003 | Meiners et al. |
| 6,676,892 B2 | 1/2004 | Das et al. |
| 6,724,001 B1 | 4/2004 | Pinckney et al. |
| 6,746,506 B2 | 6/2004 | Liu et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Turek et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,452,500 B2 | 11/2008 | Uckelmann |
| 7,454,262 B2 | 11/2008 | Larsson et al. |
| 7,537,722 B2 | 5/2009 | Andersson et al. |
| 7,540,738 B2 | 6/2009 | Larsson et al. |
| 7,569,174 B2 | 8/2009 | Ruatta et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 | 7/2010 | Abe et al. |
| 7,799,253 B2 | 9/2010 | Hochsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,137,739 B2 | 3/2012 | Philippi et al. |
| 8,187,521 B2 | 5/2012 | Larsson et al. |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,254,535 B2 | 2/2016 | Buller et al. |
| 9,310,188 B2 | 4/2016 | Snis |
| 9,505,172 B2 | 11/2016 | Liungblad |
| 9,550,207 B2 | 1/2017 | Ackelid |
| 9,802,253 B2 | 10/2017 | Jonasson |
| 9,950,367 B2 | 4/2018 | Backlund et al. |
| 10,071,422 B2 | 9/2018 | Buller et al. |
| 10,610,930 B2 * | 4/2020 | Nordkvist ............... B22F 12/00 |
| 2002/0104973 A1 | 8/2002 | Kerekes |
| 2002/0152002 A1 | 10/2002 | Lindemann et al. |
| 2002/0195747 A1 | 12/2002 | Hull et al. |
| 2003/0043360 A1 | 3/2003 | Farnworth |
| 2003/0133822 A1 | 7/2003 | Harryson |
| 2003/0205851 A1 | 11/2003 | Laschutza et al. |
| 2004/0012124 A1 | 1/2004 | Li et al. |
| 2004/0026807 A1 | 2/2004 | Andersson et al. |
| 2004/0084814 A1 | 5/2004 | Boyd et al. |
| 2004/0104499 A1 | 6/2004 | Keller |
| 2004/0148048 A1 | 7/2004 | Farnworth |
| 2004/0173496 A1 | 9/2004 | Srinivasan |
| 2004/0173946 A1 | 9/2004 | Pfeifer et al. |
| 2004/0204765 A1 | 10/2004 | Fenning et al. |
| 2004/0217095 A1 | 11/2004 | Herzog |
| 2005/0173380 A1 | 8/2005 | Carbone |
| 2005/0186538 A1 | 8/2005 | Uckelmann |
| 2005/0282300 A1 | 12/2005 | Fun et al. |
| 2006/0108712 A1 | 5/2006 | Mattes |
| 2006/0138325 A1 | 6/2006 | Choi |
| 2006/0145381 A1 | 7/2006 | Larsson |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0074659 A1 | 4/2007 | Wahlstrom |
| 2007/0175875 A1 | 8/2007 | Uckelmann et al. |
| 2007/0179655 A1 | 8/2007 | Farnworth |
| 2007/0182289 A1 | 8/2007 | Kigawa et al. |
| 2007/0298182 A1 | 12/2007 | Perret et al. |

(56) References Cited

U.S. PATENT DOCUMENTS

| | | |
|---|---|---|
| 2008/0236738 A1 | 10/2008 | Lo et al. |
| 2009/0017219 A1 | 1/2009 | Paasche et al. |
| 2009/0152771 A1 | 6/2009 | Philippi et al. |
| 2009/0206056 A1 | 8/2009 | Xu et al. |
| 2010/0007062 A1 | 1/2010 | Larsson et al. |
| 2010/0260410 A1 | 10/2010 | Taminger et al. |
| 2010/0305743 A1 | 12/2010 | Larsson |
| 2010/0310404 A1 | 12/2010 | Ackelid |
| 2010/0316856 A1 | 12/2010 | Currie et al. |
| 2011/0061591 A1 | 3/2011 | Stecker |
| 2011/0114839 A1 | 5/2011 | Stecker et al. |
| 2011/0133367 A1 | 6/2011 | Weidinger et al. |
| 2011/0240607 A1 | 10/2011 | Stecker et al. |
| 2011/0241575 A1 | 10/2011 | Caiafa et al. |
| 2011/0293770 A1 | 12/2011 | Ackelid et al. |
| 2011/0293771 A1 | 12/2011 | Oberhofer et al. |
| 2011/0309554 A1 | 12/2011 | Liska et al. |
| 2011/0316178 A1 | 12/2011 | Uckelmann |
| 2012/0100031 A1 | 4/2012 | Ljungblad |
| 2012/0164322 A1 | 6/2012 | Teulet et al. |
| 2012/0183701 A1 | 7/2012 | Pilz et al. |
| 2012/0193530 A1 | 8/2012 | Parker et al. |
| 2012/0211155 A1 | 8/2012 | Wehning et al. |
| 2012/0223059 A1 | 9/2012 | Ljungblad |
| 2012/0225210 A1 | 9/2012 | Fruth |
| 2012/0237745 A1 | 9/2012 | Dierkes et al. |
| 2012/0266815 A1 | 10/2012 | Brunermer |
| 2013/0055568 A1 | 3/2013 | Dusel et al. |
| 2013/0162134 A1 | 6/2013 | Mattausch et al. |
| 2013/0186514 A1 | 7/2013 | Zhuang et al. |
| 2013/0216959 A1 | 8/2013 | Tanaka et al. |
| 2013/0233846 A1 | 9/2013 | Jakimov et al. |
| 2013/0264750 A1 | 10/2013 | Hofacker et al. |
| 2013/0270750 A1 | 10/2013 | Green |
| 2013/0278920 A1 | 10/2013 | Loewgren |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314609 A1 | 10/2014 | Ljungblad |
| 2014/0314964 A1 | 10/2014 | Ackelid |
| 2014/0348691 A1 | 10/2014 | Ljungblad et al. |
| 2014/0367367 A1 | 11/2014 | Wood et al. |
| 2014/0363327 A1 | 12/2014 | Holcomb |
| 2015/0004045 A1 | 1/2015 | Ljungblad |
| 2015/0071809 A1 | 1/2015 | Nordkvist et al. |
| 2015/0050463 A1 | 2/2015 | Nakano et al. |
| 2015/0086409 A1 | 3/2015 | Hellestam |
| 2015/0088295 A1 | 3/2015 | Hellestam |
| 2015/0151490 A1 | 3/2015 | Jonasson et al. |
| 2015/0130118 A1 | 5/2015 | Cheng et al. |
| 2015/0139849 A1 | 5/2015 | Pialot, Jr. et al. |
| 2015/0273622 A1 | 5/2015 | Manabe |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 6/2015 | Fager |
| 2015/0283610 A1 | 9/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0236279 A1 | 8/2016 | Ashton et al. |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |
| 2016/0339536 A1 | 11/2016 | Goto |
| 2017/0080494 A1 | 3/2017 | Ackelid |
| 2017/0087661 A1 | 3/2017 | Backlund et al. |
| 2017/0106443 A1 | 4/2017 | Karlsson |
| 2017/0106570 A1 | 4/2017 | Karlsson |
| 2017/0136541 A1 | 5/2017 | Fager |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |
| 2017/0246684 A1 | 8/2017 | Hellestam |
| 2017/0246685 A1 | 8/2017 | Hellestam |
| 2017/0259338 A1 | 9/2017 | Ackelid |
| 2017/0282248 A1 | 10/2017 | Ljungblad et al. |
| 2017/0294288 A1 | 10/2017 | Lock |
| 2017/0341141 A1 | 11/2017 | Ackelid |
| 2017/0341142 A1 | 11/2017 | Ackelid |
| 2017/0348791 A1 | 12/2017 | Ekberg |
| 2017/0348792 A1 | 12/2017 | Fager |
| 2018/0009033 A1 | 1/2018 | Fager |
| 2018/0154444 A1 | 6/2018 | Jonasson |

FOREIGN PATENT DOCUMENTS

| | | |
|---|---|---|
| CN | 101635210 A | 1/2010 |
| CN | 201693176 U | 1/2011 |
| CN | 101607311 B | 9/2011 |
| CN | 203509463 U | 4/2014 |
| DE | 19952998 A1 | 5/2001 |
| DE | 20305843 U1 | 7/2003 |
| DE | 10235434 | 2/2004 |
| DE | 102005014483 A1 | 10/2006 |
| DE | 202008005417 U1 | 8/2008 |
| DE | 102007018601 A1 | 10/2008 |
| DE | 102007029052 A1 | 1/2009 |
| DE | 102008012064 A1 | 9/2009 |
| DE | 102010041284 A1 | 3/2012 |
| DE | 102011105045 B3 | 6/2012 |
| DE | 102013210242 A1 | 12/2014 |
| EP | 0289116 A1 | 11/1988 |
| EP | 0322257 A2 | 6/1989 |
| EP | 0688262 A1 | 12/1995 |
| EP | 1358994 A1 | 11/2003 |
| EP | 1418013 A1 | 5/2004 |
| EP | 1466718 A2 | 10/2004 |
| EP | 1486318 A2 | 12/2004 |
| EP | 1669143 A1 | 6/2006 |
| EP | 1683593 A2 | 7/2006 |
| EP | 1721725 A1 | 11/2006 |
| EP | 1752240 A1 | 2/2007 |
| EP | 1952932 A2 | 8/2008 |
| EP | 2011631 A1 | 1/2009 |
| EP | 2119530 A1 | 11/2009 |
| EP | 2281677 A1 | 2/2011 |
| EP | 2289652 A1 | 3/2011 |
| EP | 2292357 A1 | 3/2011 |
| EP | 2832474 A1 | 2/2015 |
| FR | 2004007124 A1 | 1/2004 |
| FR | 2980380 A1 | 3/2013 |
| JP | H05-171423 A | 7/1993 |
| JP | 2003241394 A | 8/2003 |
| JP | 2003245981 A | 9/2003 |
| JP | 2009006509 A | 1/2009 |
| JP | 2015168228 A | 9/2015 |
| JP | 2015176685 A | 10/2015 |
| JP | 2015193866 A | 11/2015 |
| JP | 2015193883 A | 11/2015 |
| SE | 524467 C2 | 8/2004 |
| WO | 1993008928 A1 | 5/1993 |
| WO | 1996012607 A1 | 5/1996 |
| WO | 1997037523 A2 | 10/1997 |
| WO | 2001081031 A1 | 11/2001 |

(56) References Cited

FOREIGN PATENT DOCUMENTS

| | | |
|---|---|---|
| WO | 2001085386 A2 | 11/2001 |
| WO | 2002008653 A1 | 1/2002 |
| WO | 2004043680 A2 | 5/2004 |
| WO | 2004054743 A1 | 7/2004 |
| WO | 2004056511 A1 | 7/2004 |
| WO | 2004106041 A2 | 12/2004 |
| WO | 2004108398 A1 | 12/2004 |
| WO | 2006091097 A2 | 8/2006 |
| WO | 2006121374 A1 | 11/2006 |
| WO | 2007112808 A1 | 10/2007 |
| WO | 2007147221 A1 | 12/2007 |
| WO | 2008013483 A1 | 1/2008 |
| WO | 2008057844 A1 | 5/2008 |
| WO | 2008074287 A1 | 6/2008 |
| WO | 2008125497 A1 | 10/2008 |
| WO | 2008147306 A1 | 12/2008 |
| WO | 2009000360 A1 | 12/2008 |
| WO | 2009072935 A1 | 6/2009 |
| WO | 2009084991 A1 | 7/2009 |
| WO | 2010095987 A1 | 8/2010 |
| WO | 2010125371 A1 | 11/2010 |
| WO | 2011008143 A1 | 1/2011 |
| WO | 2011011818 A1 | 2/2011 |
| WO | 2011030017 A1 | 3/2011 |
| WO | 2011060312 A2 | 5/2011 |
| WO | 2012102655 A1 | 8/2012 |
| WO | 2013092997 A1 | 6/2013 |
| WO | 2013098050 A1 | 7/2013 |
| WO | 2013098135 A1 | 7/2013 |
| WO | 2013159811 A1 | 10/2013 |
| WO | 2013167194 A1 | 11/2013 |
| WO | 2013178825 A2 | 12/2013 |
| WO | 2014071968 A1 | 5/2014 |
| WO | 2014092651 A1 | 6/2014 |
| WO | 2014095200 A1 | 6/2014 |
| WO | 2014095208 A1 | 6/2014 |
| WO | 2014195068 A1 | 12/2014 |
| WO | 2015032590 A2 | 3/2015 |
| WO | 2015091813 A1 | 6/2015 |
| WO | 2015120168 A1 | 8/2015 |
| WO | 2015142492 A1 | 9/2015 |

OTHER PUBLICATIONS

English Translation of Japanese office action for application 2018-524796 dated Nov. 16, 2020 (5 pages).

Klassen, Alexander et al., "Modelling of Electron Beam Absorption in Complex Geometries", Journal of Physics D: Applied Physics, Jan. 15, 2014, 12 pages, vol. 47, No. 6, Institute of Physics Publishing Ltd., Great Britain.

International Pre Li Minary Examining Authority, Written Opinion (Second) for International Application No. PCTIEP20161076972, dated Feb. 1, 2018, 9 pages, European Patent Office, Netherlands.

International Searching Authority, International Search Report and Written Opinion for International Application No. PCT/EP20161076972, dated Jan. 16, 2017, 12 pages, European Patent Office, Netherlands.

Gibson D.W., et al., "Additive Manufacturing Technologies: Rapid Prototyping to Direct Digital Manufacturing", 2010, pp. 126-129, Springer, New York.

Motojima, Seiji, et al., "Chemical Vapor Growth OfLaB6 Whiskers and Crystals Having a Sharp Tip", Journal of Crystal Growth, vol. 44, No. 1, 1978 (Aug. 1, 1978), pp. 106-109.

Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.

Weigel, T., et al., "Design and Preparation of Polymeric Scaffolds for Tissue Engineering," Expert Rev. Med. Devices, 2006, pp. 835-851, vol. 3, No. 6, XP002691485.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.

Japanese Patent Office Action submitted in JP Application No. 2021-078613 dated Apr. 25, 2022.

English Translation of Chinese office action for application 201680079321.2 dated Aug. 4, 2020 (13 pages).

\* cited by examiner

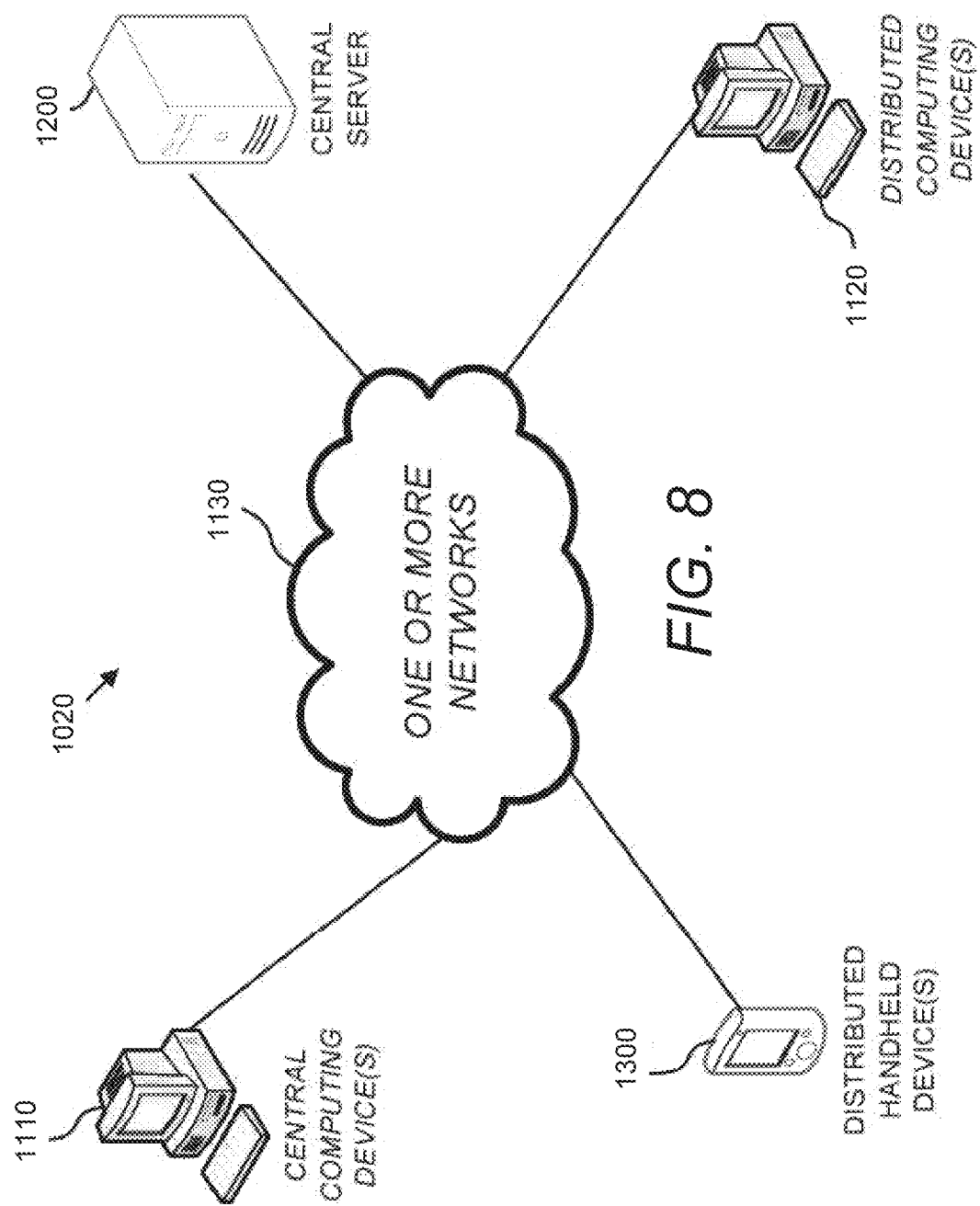

ADDITIVE MANUFACTURING OF THREE-DIMENSIONAL ARTICLES

CROSS-REFERENCE TO RELATED APPLICATIONS

This application is a divisional of U.S. Non-provisional patent application Ser. No. 15/344,732 filed Nov. 7, 2016, which claims priority to and the benefit of U.S. Provisional Patent Application Ser. No. 62/257,060, filed Nov. 18, 2015; the contents of both of which are hereby incorporated by reference in their entirety.

BACKGROUND

Technical Field

The present invention relates to a method for additive manufacturing of a three dimensional article by successively fusing individual layers of powder material.

Related Art

Freeform fabrication or additive manufacturing is a method for forming three-dimensional articles through successive fusion of chosen parts of powder layers applied to a worktable.

An additive manufacturing apparatus may comprise a work table on which the three-dimensional article is to be formed, a powder dispenser or powder distributor, arranged to lay down a thin layer of powder on the work table for the formation of a powder bed, a high energy beam for delivering energy to the powder whereby fusion of the powder takes place, elements for control of the energy given off by the energy beam over the powder bed for the formation of a cross section of the three-dimensional article through fusion of parts of the powder bed, and a controlling computer, in which information is stored concerning consecutive cross sections of the three-dimensional article. A three-dimensional article is formed through consecutive fusions of consecutively formed cross sections of powder layers, successively laid down by the powder dispenser. In electron beam melting (EBM) the high energy beam is one or a plurality of electron beams.

In additive manufacturing a short manufacturing time and high quality of the finalized product is of outmost importance. Desired material properties of the final product may depend on the ability to control the heating and/or fusion process. For this reason there is a need in the EBM art to improve sintering behavior and/or melt behavior.

BRIEF SUMMARY

An exemplary object of the invention is to provide a method which fast and accurately improves the sintering and or melt behaviour in an additive electron beam melting manufacturing process for improving the material characteristics and/or end product dimension accuracy of the manufactured three-dimensional article. The above mentioned object is achieved by the features recited in the claims provided herein.

In a first aspect of various embodiments of the invention it is provided a method for forming a three-dimensional article through successively depositing individual layers of powder material that are fused together so as to form the article, the method comprising the steps of: providing at least one electron beam source emitting an electron beam for at least one of heating or fusing the powder material, where the electron beam source comprises a cathode and an anode, varying an accelerator voltage between the cathode and the anode between at least a first and second predetermined value during the forming of the three-dimensional article, applying the first value of accelerator voltage between the cathode and the anode when the formation of the three dimensional article is in a first stage or process step, and applying the second value of accelerator voltage between the cathode and the anode when the formation of the three dimensional article is in a second stage or process step, wherein the first value of the accelerator voltage differs from the second value of the accelerator voltage by at least 10 kV.

An exemplary advantage of various embodiments of the present invention is that the accelerator voltage may be varied depending on which process step is to be used. Some process steps may require a higher accelerator voltage while other process steps are more or less insensitive to the accelerator voltage. By applying different accelerator voltages in different process steps may improve the end quality of the three-dimensional article. In certain embodiments, the intermittent switching between different accelerator voltages may be between two stages of the formation of the three-dimensional article, wherein both stages may be within a single process step (e.g., preheating, or the like).

In various example embodiments of the present invention the first step is used for preheating of unfused powder and second step is used for fusion of the powder; the first step is used for fusion of the powder and second step is used for post heat treatment of already fused powder; the first step is used for fusion of the powder and second step is used for remelting of already fused powder; the first step is used for fusion of inner areas of the three dimensional article and second step is used for fusion of a contour of the three-dimensional article; the first step is used for forming solid structures and the second step is used for net structures; the first step is used for first type of microstructures and second step is used for second type of microstructures; the first step is used for forming support structures for the three-dimensional article and the second step is used for forming the three-dimensional article; and/or the first step is used for a central melting spot and the second step is used for at least one surrounding heating spot. In still other embodiments, the first stage or step is a first portion of the preheating process step and the second stage or step is a second portion of the preheating process step. Multiple first and second stages (e.g., in an alternating fashion) may occur within a single process step (e.g., within the preheating process).

An exemplary advantage of at least these embodiments is that the penetration depth of the electron beam may be changed depending on different process steps. A melting with a high electron beam current may need a higher accelerator voltage than melting with a low electron beam current.

In various example embodiments of the present invention the first value of the accelerator voltage differs from the second value of the accelerator voltage by at least 25 kV or 50 kV. An exemplary advantage of at least these embodiments is that the difference in accelerator voltage between different steps may be varied when manufacturing a three dimensional article.

In various example embodiments of the present invention the first and/or the second accelerator voltage between the cathode and the anode is varied as a function of a deflection angle of the electron beam. An exemplary advantage of at least these embodiments is that the penetration depth may be kept constant for a predetermined area independent of the actual deflection angle of the electron beam.

In various example embodiments of the present invention the first and/or the second accelerator voltage between the cathode and the anode is varied as a function of a thickness of already fused three-dimensional article. An exemplary advantage of at least these embodiments is that one may reduce the risk of over melting thin structures by changing the penetration depth of the electron beam.

In various example embodiments of the present invention further comprising the steps of: providing the first predetermined accelerator voltage at a first position and the second predetermined accelerator voltage at a second position, where the first and second positions are laterally separated from each other in a single layer of the three-dimensional article, and switching on and off the electron beam at least once at the first and second positions.

The advantage of at least this embodiment is that different positions of the three dimensional article may be melted intermittently, for instance an inner area and a boundary area. The beam may be switched back and forth from the inner area to the boundary area and simultaneously changing the accelerator voltage for the different regions. Here one can use a higher accelerator voltage for the inner area and a lower accelerator voltage for the boundary area.

In various example embodiments of the present invention a frequency of switching on and off the electron beam is one of constant or varied. An exemplary advantage of at least these embodiments is that not only the accelerator voltage may be varied when switching from one type of melting area to another type of melting area but also the frequency of the switching. This means that the accuracy and flexibility of energy deposition may further be improved.

In various example embodiments it is provided a program element configured and arranged when executed on a computer to implement a method for forming a three-dimensional article through successively depositing individual layers of powder material that are fused together so as to form the article, the method comprising the steps of: providing at least one electron beam source emitting an electron beam for at least one of heating or fusing the powder material, where the electron beam source comprises a cathode and an anode, varying an accelerator voltage between the cathode and the anode between at least a first and second predetermined value during the forming of the three-dimensional article.

In still another aspect of various embodiments of the present invention it is provided a computer readable medium having stored thereon the program element.

In yet another aspect of various embodiments of the present invention it is provided a non-transitory computer program product comprising at least one non-transitory computer-readable storage medium having computer-readable program code portions embodied therein, the computer-readable program code portions comprising: an executable portion configured for controlling at least one electron beam source emitting an electron beam for at least one of heating or fusing powder material, where the electron beam source comprises a cathode and an anode; and an executable portion configured for varying an accelerator voltage between the cathode and the anode between at least a first and second predetermined value during formation of a three-dimensional article which is formed by successively depositing individual layers of powder material that are fused together so as to form the article.

In yet another aspect of various embodiments of the present invention it is provided an apparatus for forming a three-dimensional article through successively depositing and fusing individual layers of powder material so as to form the article. The apparatus comprises: at least one electron beam source emitting an electron beam for at least one of heating or fusing the powder material, where the electron beam source comprises a cathode and an anode, and at least one control unit. The at least one control unit is configured for: varying an accelerator voltage between the cathode and the anode between at least a first and a second predetermined value during the forming of the three-dimensional article, applying the first predetermined value of the accelerator voltage between the cathode and the anode when the formation of the three dimensional article is in a first process step, and applying the second predetermined value of the accelerator voltage between the cathode and the anode when the formation of the three dimensional article is in a second process step, wherein the predetermined first value of the accelerator voltage differs from the second predetermined value of the accelerator voltage by at least 10 kV.

According to various exemplary embodiments, the electron beam source may further comprises a grid, whereby the grid voltage is synchronously varied with the accelerator voltage between the cathode and the anode, as such is varied between at least the first and the second predetermined value during the forming of the three-dimensional article.

According to various exemplary embodiments, the at least one electron beam source comprises a first electron beam source and a second electron beam source; the first accelerator voltage emanates from the first electron beam source; and the second accelerator voltage emanates from the second electron beam source. In at least such embodiments, the first accelerator voltage emanates from the first electron beam source for a first predetermined period of time; the second accelerator voltage emanates from the second electron beam source for a second predetermined period of time; and the first and second predetermined periods of time are non-overlapping.

In these and still other exemplary embodiments, the recited methods may further comprises the steps of providing the first predetermined accelerator voltage at a first position during the first predetermined period of time; providing the second predetermined accelerator voltage at a second position during the second predetermined period of time; and switching on and off the electron beams at least once at each of the first and second positions. In such and still other embodiments, the first and second positions are laterally separated from each other in a single layer of the three-dimensional article. Still further, a frequency of the switching on and off of the electron beam is one of constant or varied.

In still other embodiments, one of the first or the second accelerator voltage between the cathode and the anode is varied as a function of a deflection angle of the electron beam; and the other of the first or the second accelerator voltage between the cathode and the anode is varied as a function of a thickness of an already fused three-dimensional article.

All examples and exemplary embodiments described herein are non-limiting in nature and thus should not be construed as limiting the scope of the invention described herein. Still further, the advantages described herein, even where identified with respect to a particular exemplary embodiment, should not be necessarily construed in such a limiting fashion.

BRIEF DESCRIPTION OF THE SEVERAL VIEWS OF THE DRAWING(S)

The invention will be further described in the following, in a non-limiting way with reference to the accompanying drawings. Same characters of reference are employed to indicate corresponding similar parts throughout the several figures of the drawings:

FIG. 8 is a block diagram of an exemplary system 1020 according to various embodiments;

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Still further, to facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g., of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 2:
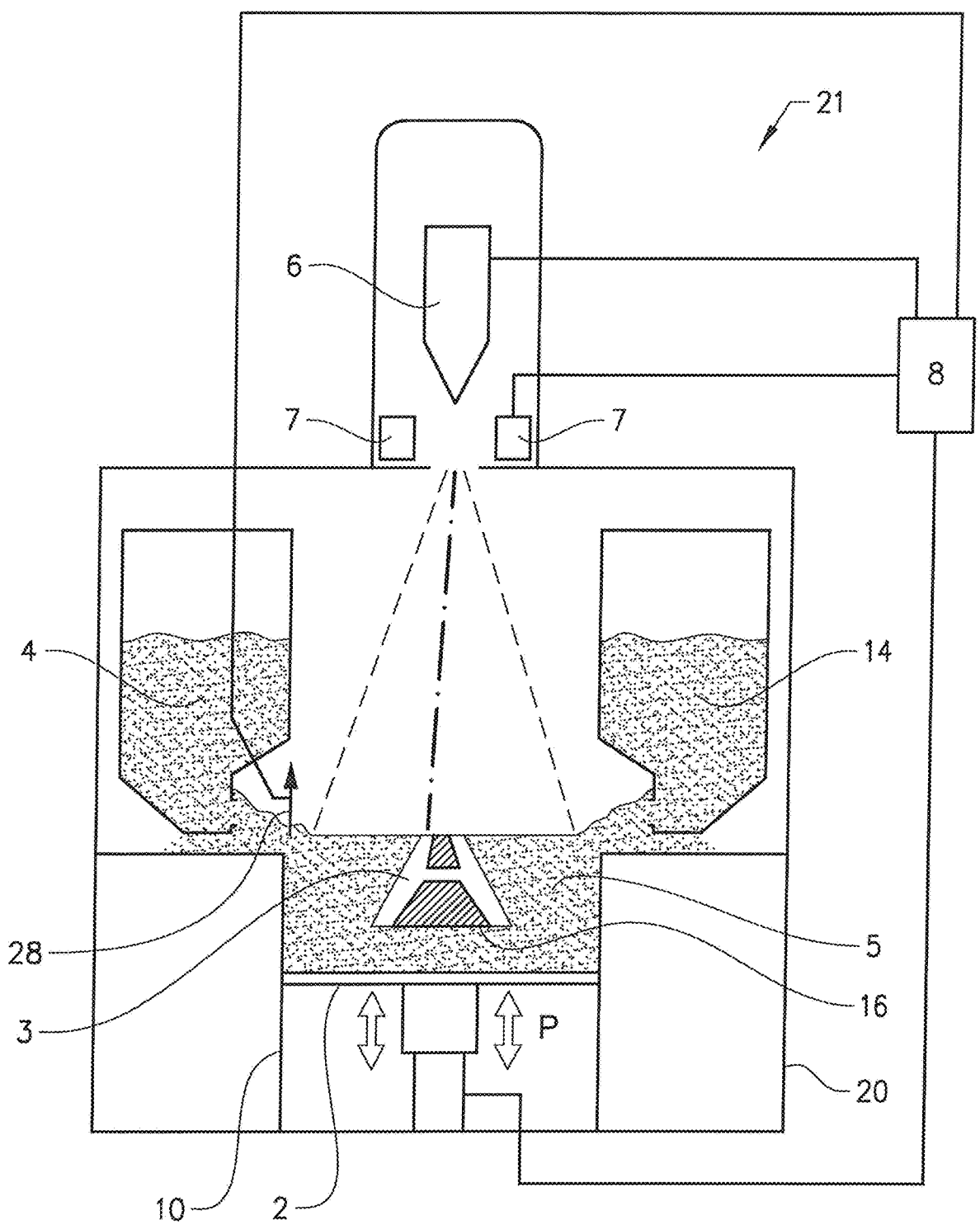
FIG. 2 depicts, in a schematic view, an example embodiment of an apparatus for producing a three dimensional product which may have an electron beam source according to FIG. 1.

FIG. 2 depicts an embodiment of a freeform fabrication or additive manufacturing apparatus 21 in which the inventive method according to the present invention may be implemented.

The apparatus 21 comprising an electron beam source 6; deflection coils 7; two powder hoppers 4, 14; a build platform 2; a build tank 10; a powder distributor 28; a powder bed 5; and a vacuum chamber 20.

The vacuum chamber 20 is capable of maintaining a vacuum environment via a vacuum system, which system may comprise a turbo molecular pump, a scroll pump, an ion pump and one or more valves which are well known to a skilled person in the art and therefore need no further explanation in this context. The vacuum system is controlled by a control unit 8.

The electron beam source 6 is generating an electron beam which is used for pre heating of the powder, melting or fusing together powder material provided on the build platform 2 or post heat treatment of the already fused powder material. At least a portion of the electron beam source 6 may be provided in the vacuum chamber 20. The control unit 8 may be used for controlling and managing the electron beam emitted from the electron beam source 6. At least one focusing coil (not shown), at least one deflection coil 7, an optional coil for astigmatic correction (not shown) and an electron beam power supply (not shown) may be electrically connected to the control unit 8. In an example embodiment of the invention the electron beam source 6 may generate a focusable electron beam with variable accelerating voltage of about 5-100 kV and with a beam power in the range of 2-15 kW. The pressure in the vacuum chamber may be $1 \times 10^{-3}$ mbar or lower when building the three-dimensional article by fusing the powder layer by layer with the energy beam.

The powder hoppers 4, 14 comprise the powder material to be provided on the build platform 2 in the build tank 10. The powder material may for instance be pure metals or metal alloys such as titanium, titanium alloys, aluminum, aluminum alloys, stainless steel, Co—Cr alloys, nickel based super alloys, etc.

The powder distributor 28 is arranged to lay down a thin layer of the powder material on the build platform 2. During a work cycle the build platform 2 will be lowered successively in relation to a fixed point in the vacuum chamber. In order to make this movement possible, the build platform 2 is in one embodiment of the invention arranged movably in vertical direction, i.e., in the direction indicated by arrow P. This means that the build platform 2 starts in an initial position, in which a first powder material layer of necessary thickness has been laid down. Means for lowering the build platform 2 may for instance be through a servo engine equipped with a gear, adjusting screws, etc. The servo engine may be connected to the control unit 8.

An electron beam may be directed over the build platform 2 causing the first powder layer to fuse in selected locations to form a first cross section of the three-dimensional article 3. The beam may be directed over the build platform 2 from instructions given by the control unit 8. In the control unit 8 instructions for how to control the electron beam for each layer of the three-dimensional article may be stored. The first layer of the three dimensional article 3 may be built on the build platform 2, which may be removable, in the powder bed 5 or on an optional start plate 16. The start plate 16 may be arranged directly on the build platform 2 or on top of a powder bed 5 which is provided on the build platform 2.

After a first layer is finished, i.e., the fusion of powder material for making a first layer of the three-dimensional article, a second powder layer is provided on the build platform 2. The thickness of the second layer may be determined by the distance the build platform is lowered in relation to the position where the first layer was built. The second powder layer is in various embodiments distributed according to the same manner as the previous layer. However, there might be alternative methods in the same additive manufacturing machine for distributing powder onto the work table. For instance, a first layer may be provided via a first powder distributor 28, a second layer may be provided by another powder distributor. The design of the powder distributor is automatically changed according to instructions from the control unit 8. A powder distributor 28 in the form of a single rake system, i.e., where one rake is catching powder fallen down from both a left powder hopper 4 and a right powder hopper 14, the rake as such can change design.

After having distributed the second powder layer on the build platform, the energy beam is directed over the work table causing the second powder layer to fuse in selected locations to form a second cross section of the three-dimensional article. Fused portions in the second layer may be bonded to fused portions of the first layer. The fused portions in the first and second layer may be melted together by melting not only the powder in the uppermost layer but also remelting at least a fraction of a thickness of a layer directly below the uppermost layer.

The powder may be allowed to be slightly sintered during a pre-heating process. The pre-heating process is taking place before the actual fusing of the powder material in order to create a predetermined cross section of the three-dimensional article. The preheating may be performed in order to increase the conductivity of the powder material and/or to increase the working temperature of the powder material to be within a predetermined temperature range.

Figure 1:
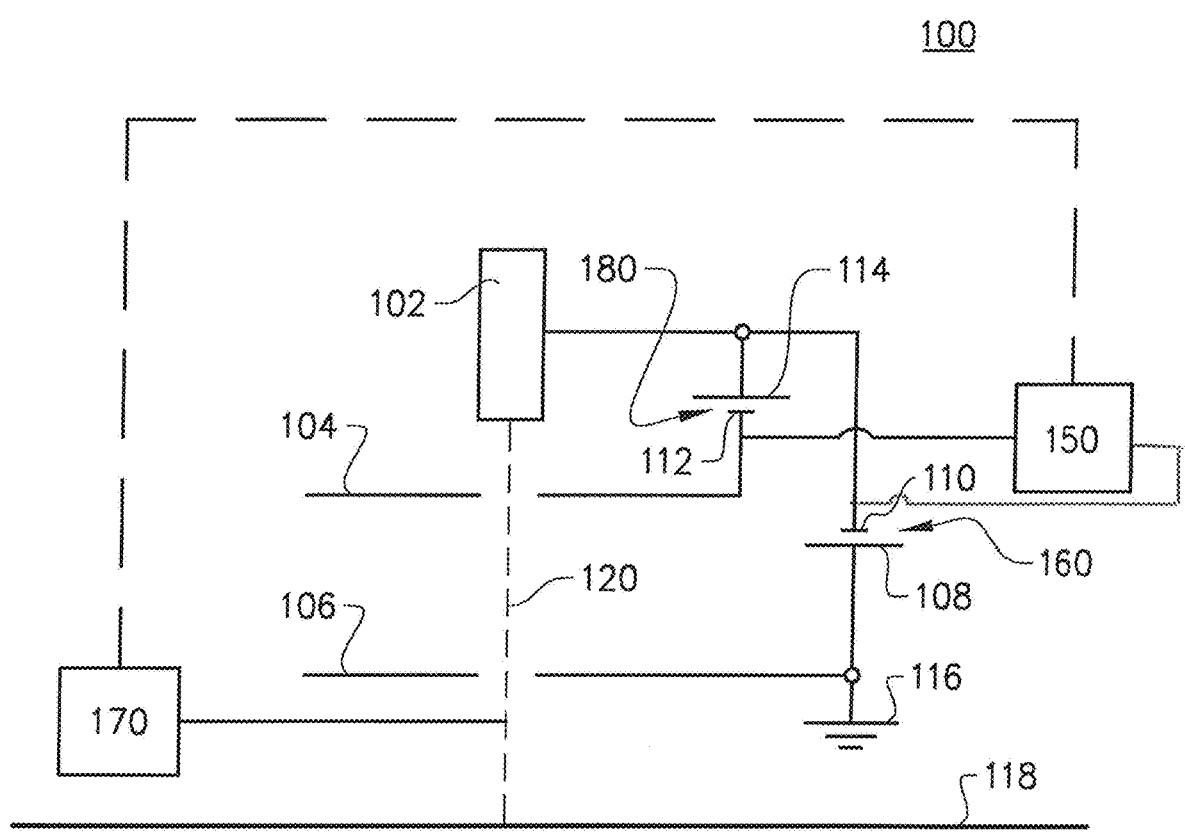
FIG. 1 depicts, in a schematic side view, an example embodiment of an electron beam source.

FIG. 1 depicts, in a schematic view, an exemplary embodiment of an electron beam source in which the inventive method may be implemented. The electron beam source 100 comprises a cathode 102, a grid 104 and an anode 106. Electrons emitted at the cathode 102 being on negative potential are accelerated towards the anode 106 and finally a target surface 118. A grid 104 is set at a predetermined distance from the cathode 102. The cathode 102 may be provided with a voltage which may cause the cathode to heat up, where upon the cathode 102 releases electrons by thermionic emission.

A variable accelerator voltage 160 is provided between the cathode and the anode 106. The variable accelerator voltage 160 causes the emitted electrons from the cathode 102 to accelerate towards the anode 106 thus establishing an electron beam 120. The electron beam 120 may impinge on a substrate surface 118, which may be a powder layer in an additive manufacturing process. In order to guide and focus the electron beam there may further be arranged at least one focusing coil and at least one deflection coil.

In the electron beam source 100 the grid 104 is provided between the cathode 102 and the anode 106. The grid 104 may be arranged as a plate having an aperture. The aperture may be aligned with the cathode 102. The size of the aperture in the grid 104 may correspond to a cross section of the electron beam 120 at the position of the grid 104.

A grid voltage 180 may be provided between the grid 104 and the cathode 102 and may be adjusted between a negative blocking voltage and a full power voltage and thereby adjusting an electron beam current between 0-maximum electron beam current. In FIG. 1 the cathode 102 may be provided with a negative potential of −20 kV to −100 kV. A first connection point 110 of the variable accelerator voltage 160 and a first connection point 114 of the grid voltage 180 may be fixed to the same potential of −20 kV to −100 kV. A second connection point 108 of the accelerator voltage 160 may be provided with ground potential. A second connection point 112 of the grid voltage 180 may be varied between the negative blocking voltage and the full power voltage. A second control unit 150 may be controlling the voltage on the first connection point 110 of the variable accelerator voltage and the second connection point 112 of the grid voltage in order to adjust the accelerator voltage and electron beam current to desired values. The second control unit 150 may be a physically separate control unit in connection with the control unit 8 or fully integrated in the control unit 8.

The target surface 118 may be set to ground potential or a positive potential. The electron beam source 100 may also comprise means 170 for detecting the actual electron beam current. An example means for detecting the electron beam current on the target surface may be to detect the actual loading of the high voltage source providing the accelerator voltage 160, indicated by box 170 in FIG. 1. This may be done by simply measuring the electron beam passing between the first and second connection points 110 and 108 respectively.

If the cathode is provided with a negative voltage of −60 kV the negative blocking voltage may be around −61 kV, i.e., the second connection point 112 of the grid voltage is set at −61 kV and the first connection point 114 is set to −60 kV, for blocking the electrons by the grid 104. If starting to decrease the negative blocking voltage at the second connection point 112, some of the electrons emitted from the cathode will be allowed to pass the grid 104. By varying the grid voltage in this example embodiment between −61 kV to −~60 kV, when the cathode is provided with a fixed negative potential of −60 kV, the electron beam current may vary from 0 mA-maximum electron beam current which may be 25 mA for a predetermined size and shape of the cathode and a predetermined size and shape of the aperture in the grid 104. Other accelerator voltages and/or other size, shape and emissivity of the cathode and/or other size and shape of the aperture in the grid may affect the maximum electron beam current to be higher or lower than the exemplified 25 mA.

According to various example embodiments of the present invention a first accelerator voltage is applied between the anode and cathode when the formation of the three-dimensional article is in a first process step and a second accelerator voltage is applied between the anode and cathode when the formation of the three-dimensional article is in a second process step.

In an example embodiment with at least one grid the accelerator voltage 160 and the grid voltage 180 are synchronized with each other. If the accelerator voltage 160 is first set to a first value, for instance 75 kV, in a first process step, the grid voltage 180 may be varied from ~76 kV for zero electron beam current to 75 kV for maximum electron beam current. If the accelerator voltage is changed from the first value of 75 kV to a second value, for instance 50 kV, in a second process step, the grid voltage 180 may also be changed to be varied from ~51 kV for zero electron beam current to 50 kV for maximum electron beam current. In other words a first accelerator voltage may have a maximum electron beam current when a first grid voltage is applied being equal to the first accelerator voltage whereas a second accelerator voltage may have a maximum electron beam current when a second grid voltage is applied being equal to the second accelerator voltage.

According to an example embodiment the first process step may for instance be a preheating of unfused powder. During preheating a relatively low accelerator voltage may be used, e.g., between 25-55 kV. The second process step may for instance be a fusion of the powder material in order to create a cross section of the three dimensional article. During the fusion the accelerator voltage may be relatively high, e.g., between 55-100 kV. A higher accelerator voltage increases the penetration depth of the electron beam which may ensure proper melting of the powder layer together with a re-melting of already fused underlying layers.

The first process step may also be the fusion of the powder and the second step may be a post heat treatment of already fused powder. During the fusion the accelerator voltage may be relatively high, e.g., between 55-100 kV. A higher accelerator voltage increases the penetration depth of the electron beam which may ensure proper melting of the powder layer together with a remelting of already fused underlying layers. During the post heat treatment the accelerator voltage may be relatively low, e.g., between 25-55 kV. During the post heat treatment the quality of the electron beam is not of importance as it is during the fusion step. Therefore a low accelerator voltage may be used during the post heat treatment, which post heat treatment serves to maintain the already built three-dimensional article within a predetermined temperature interval.

The first process step may be the fusion of the powder material and the second step may be a remelting of already fused powder. During the fusion the accelerator voltage may be relatively high, e.g., between 55-100 kV. A higher accelerator voltage increases the penetration depth of the electron beam which may ensure proper melting of the powder layer together with a remelting of already fused underlying layers. During the remelting step the accelerator voltage may be relatively low, e.g., between 25-55 kV.

Figure 3:
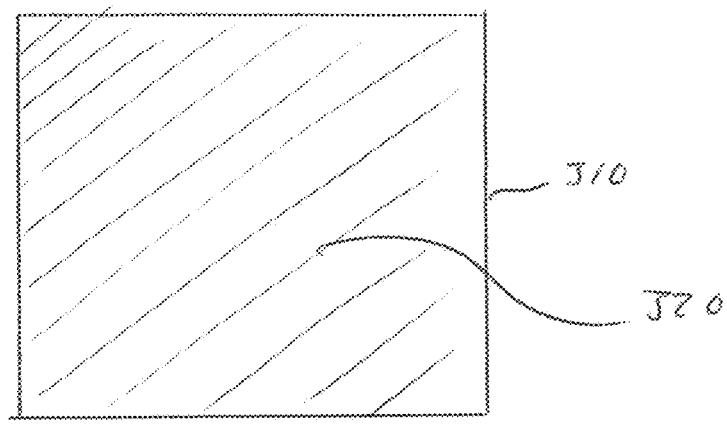
FIG. 3 depicts a top view of a square object which is to be additively manufactured.

The first process step may be a fusion of inner areas of the three dimensional article and the second process step may be a fusion of a contour of the three dimensional article. FIG. 3 depicts a top view of a square object which is to be additively manufactured. The square object has an inner area 320 surrounded by a contour 310. The inner area may be fused with a first accelerator voltage between 40-55 kV and the contour may be fused with a second accelerator voltage between 55-100 kV. The reason for using a higher accelerator voltage for the contour 310 compared for the inner area 320 is that higher accuracy is needed for fusing the outer periphery (contour) of the three dimensional article compared with the inner area 320 of the same, i.e., there may be a need for a smaller and more well defined melting spot for the contour 310 compared with meting a random portion of an inner area 320

Figure 5:
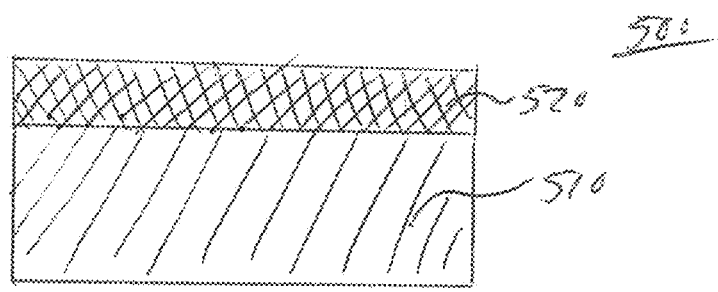

The first step may be used for forming solid structures and the second step may be used for forming net structures. During fusion of the solid structures the accelerator voltage may be between 65-100 kV, whereas during fusion of the net structures the accelerator voltage may be between 40-65 kV. FIG. 5 depicts a cross sectional side view of a three dimensional article 500. The three-dimensional article 500 comprises a solid portion 510 and a net structure portion 520. Net structures may be fused using a lower accelerator voltage compared to fusing solid structures. The reason is that the penetration depth may need to be limited to the dimension of the net structure itself and for this reason a too high accelerator voltage cannot be used.

The first step may be used for a first type of micro structures and the second step may be used for a second type of microstructures. Different accelerator voltage may be a prerequisite to introduce different microstructures into different areas of the three-dimensional article. A first type of microstructures may be introduced in the three dimensional article for accelerator voltages between 40-65 kV and a second type of microstructures may be introduced in the three dimensional article for accelerator voltages between 65-100 kV.

Figure 6:
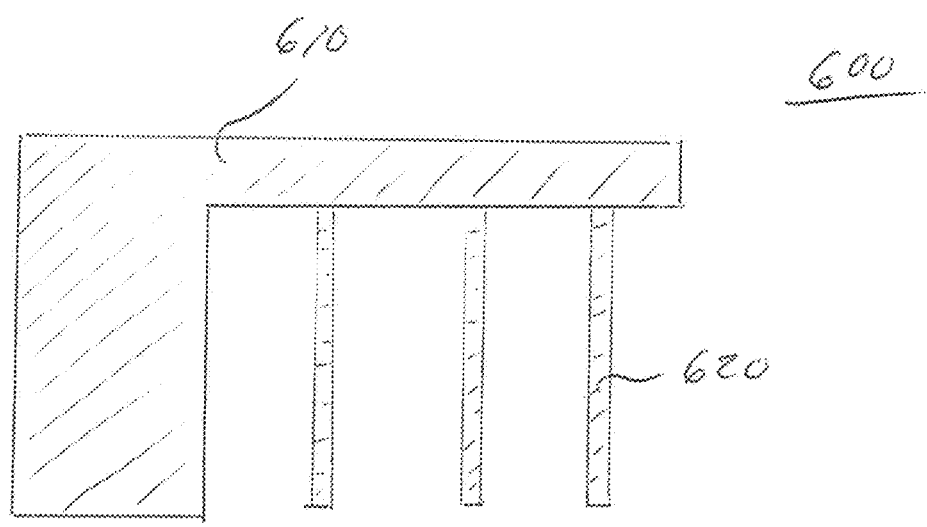

The first step may be used for forming support structures and the second step may be used for forming the three-dimensional article. Support structures may be built using almost any accelerator voltage whereas the three-dimensional article needs to achieve predetermined material properties. For this reason as low as possible accelerator voltage may be used for building the support structures while the three-dimensional article need to use a predetermined range of accelerator voltages in order to meet the predetermined material characteristics. In FIG. 6 it is depicted a cross sectional side view of a three-dimensional article 600. The three-dimensional article 600 comprises a final structure 610 and support structures 620. The support structures 620 are only used during manufacturing for supporting negative surfaces and to drain heat from the final article 610. The support structures 610 are to be removed from the final article 610. The support structures may be manufactured with built in micro cracks and/or defects which will facilitate removal of the support structures 620 from the final article 610.

Figure 7A:
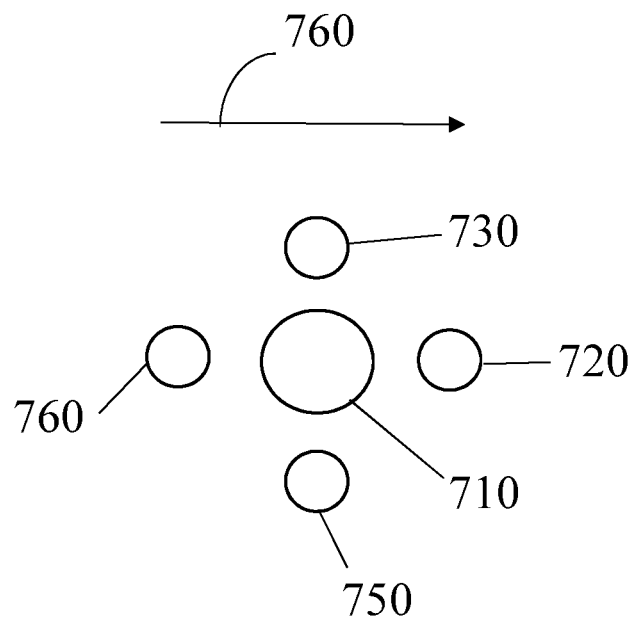
FIG. 7A is a top view of a central melting spot together with four surrounding heating spots.

The first step may be used for a central melting spot and the second step may be used for at least one surrounding heating spot. FIG. 7A depicts a central melting spot 710 together with 4 surrounding heating spots 720, 730, 740 and 750. The scanning direction of the central melting spot is indicated by arrow 760. The central melting spot 710 may melt the powder material with a relatively high accelerator voltage, e.g., between 65-100 kV. The surrounding heating spots 720, 730, 740 and 750 may use a relatively low accelerator voltage, e.g., between 40-55 kV. A first surrounding heating spot 720 is heating unfused powder material before the central melting spot 710 is melting the powder material. The second surrounding spot 730 and third surrounding spot 750 is heating the powder material in close proximity to a melting pool caused by the central melting spot 710. The second surrounding spot 730 and the third surrounding spot 750 may smoothen out a temperature gradient between the melt pool and the unfused powder. The fourth surrounding spot 740 is heating already fused powder material. The fourth spot helps to increase the cool down time and thereby improve material characteristics.

Figure 7B:
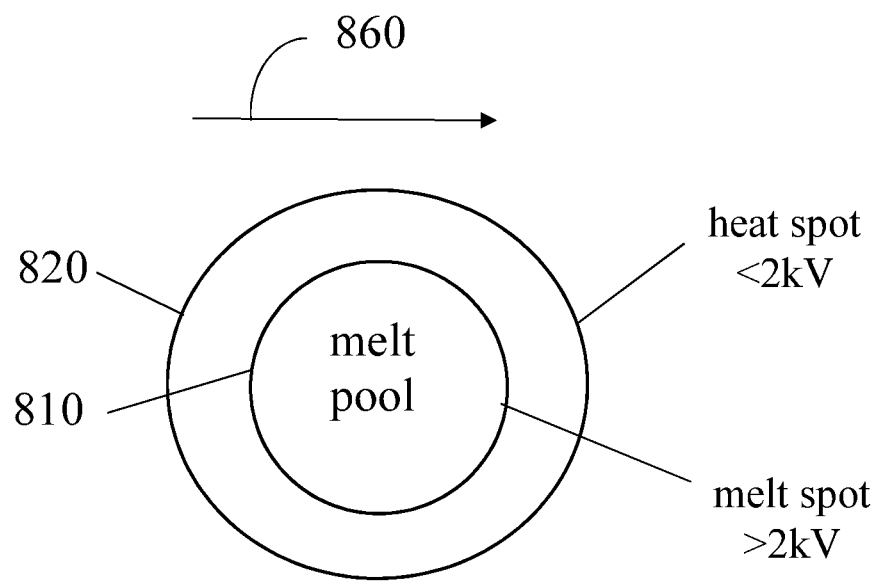
FIG. 7B is a top view of a central melting spot together with a concentric heating spot.

The first step may be used for a central melting spot and the second step may be used for at least one concentric or partially overlapping heating spot. FIG. 7B depicts a central melting spot 810 together with a concentric heating spot 820. The scanning direction of the central melting spot is indicated by arrow 860. The central melting spot 810 may melt the powder material with a relatively high accelerator voltage, e.g., between 65-100 kV. In certain embodiments the relatively high accelerator voltage is any value greater than 2 kV. The concentric (or partially overlapping, not illustrated) heating spot 820 may use a relatively low accelerator voltage, e.g., between 40-55 kV. In certain embodiments, the relatively low accelerator voltage is any value less than 2 kV. The melting and heating spots 810, 820 may be the same in size if partially overlapping. If concentric the two spots will be differently sized, with the heating spot being the larger of the two. In certain partially overlapping embodiments, the melting and heating spots may also be differently sized. In any of these and still other embodiments, the switching frequency between the high and low accelerator voltages may be between 100 Hz-20 kHz.

Thus, density per unit time is increased without increased current, use of a smaller spot, and/or use of a slower scanning speed.

According to another example embodiment the first process step and the second process step may for instance be distinct subsets of a preheating of unfused powder. In the preheating step, as a non-limiting example, a relatively low accelerator voltage may be first selected, e.g., between 25-55 kV. In certain embodiments, the relatively low accelerator voltage may be as low as 2 kV. In these embodiments, while still in the preheating step, the relatively low accelerator voltage may be switched to a high accelerator voltage, e.g., between 55-100 kV. In certain embodiments, the high accelerator voltage may be anything above 2 kV, preferably, however, 50 kV or higher. In at least one embodiment, the relatively low accelerator voltage is anything less than 2 kv, while the high accelerator voltage is anything greater than 2 kV.

Advantageously, where switching between the relatively low and the high accelerator voltages occurs within the preheating step, each material will emit secondary electrons differently depending on the energy of the bombarding electrons. As a non-limiting example, if the electrons have a low energy, the powder material will be positively charged because one bombarding electron will emit more than one electron. If, however, the bombarding electron has a high energy (e.g., above 50 kV), the powder material will be negatively charged. Stated otherwise, when a relatively low accelerator voltage is used (e.g., of less than 2 kV), secondary electron emission yield is greater than 1, resulting in a positively charged powder material; on the other hand when a high accelerator voltage is used (e.g., of greater than 2 kV), the secondary electron emission yield is less than 1, resulting in a negatively charged powder material.

Thus, via use of a single electron beam source, if the accelerator voltage thereof is switched quickly enough between high and low accelerator voltage values, the mean charging density of the powder material may be led to zero. In such a scenario, advantageously no repelling forces would exist between particles within the powder material; or stated otherwise, the powder particles will exhibit neutral mean charge characteristics. Of note, the switching frequency in at least these embodiments should be high enough to neutralize an existing positive or negative induced charge density in the powder material. As a non-limiting example, the switching frequency may be adapted to the scanning speed, e.g., the higher the scanning speed the higher the switching frequency. In at least one exemplary embodiment, the switching frequency is at least 1 kHz.

In the exemplified embodiments detailed above the first and second accelerator voltages may emanate from a single electron beam source. Alternatively the first and second accelerator voltages may emanate from a first and second electron beam source respectively.

A beam spot power from the first and second accelerator voltage may be equal. In an example embodiment the first and second accelerator voltages differ from each other by at least 10 kV. In another example embodiment the first and second accelerator voltages differ from each other by at least 25 kV. In yet another example embodiment the first and second accelerator voltages differ from each other by at least 50 kV.

The first and/or second accelerator voltages may be fixed values, e.g., a full inner area may be melted by a first fixed accelerator voltage and a contour may be melted by a second fixed accelerator voltage, where the first and second accelerator voltages differ from each other by at least 10 kV.

In another example embodiment the accelerator voltage may be varied as a function of deflection angle of the electron beam. The first accelerator voltage may be applied for zero deflection of the electron beam. As the deflection is increasing the accelerator voltage may be increased. For instance, this means that within the inner area different positions may be melted with different accelerator voltage. The same may be applied for the contour. Different positions on the contour may be melted by different accelerator voltages depending on the degree of deflection of the electron beam. In these and yet other embodiments, a switching frequency of the accelerator voltage may also be varied as a function of scanning speed, for example the higher the scanning speed the higher the switching frequency.

Figure 4:
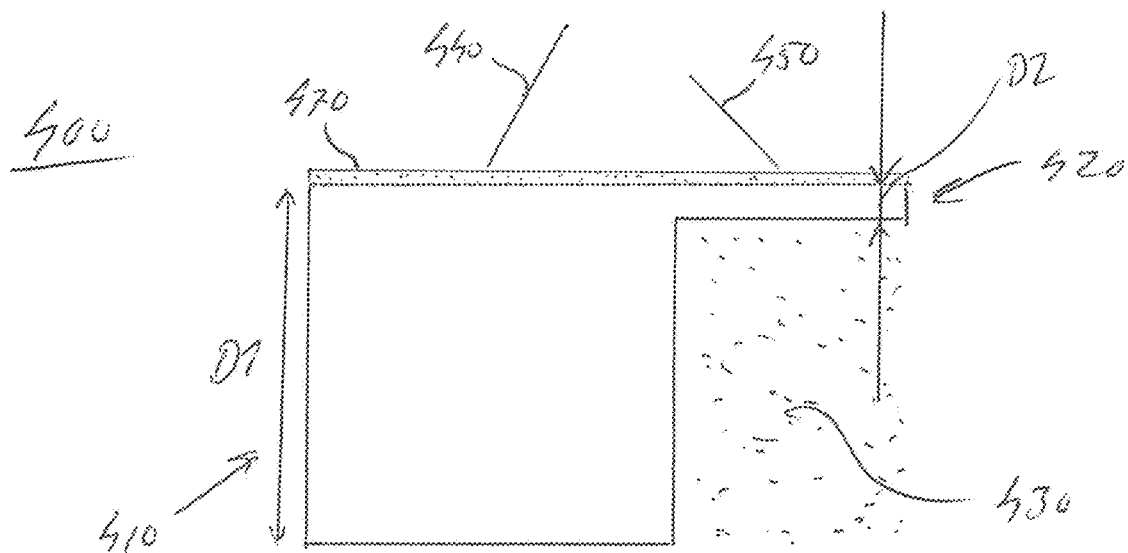
FIG. 4-6 depict cross sectional side views of different example embodiments of additively manufactured three-dimensional articles.

In another example embodiment the accelerator voltage may be varied as a function of a thickness of an already fused three-dimensional article. FIG. 4 depicts a cross sectional side views of an example embodiment of an additively manufactured three-dimensional article 400. The three-dimensional article 400 comprises a first portion 410 having a thickness D1 and a second portion 420 having a thickness D2. Unfused powder is denoted by 430. A powder layer 470 which is to be fused may use a first electron beam 440 with a first accelerator voltage when being above the first portion and a second electron beam 450 with a second accelerator voltage when being above the second portion 420. The first and second electron beam may emanate from one and the same electron beam source or from different electron beam sources. The first electron beam 440 may have a higher accelerator voltage than the second electron beam 450. The accelerator voltage of the second electron beam 450 may be varied as a function of the thickness D2 of the second portion 420. The accelerator voltage is varied as a function of the already fused thickness as long as the thickness is smaller than a predetermined thickness. The predetermined thickness may be 50 mm. For thicknesses larger than 50 mm a fixed accelerator voltage may be used. The thickness is the thickness of already fused material directly below the electron beam spot which is to melt the powder layer 470. The thickness may be a homogenous thickness or a summation of separately melted portions having unfused powder material in between.

The accelerator voltage may vary as a function of the deflection angle and/or the thickness of already fused powder material with a linear function, polynomial function or exponential function.

The first and second accelerator voltages may be used in a single scan line, i.e., an inner area may be melted first with a first accelerator voltage in a first portion of a scan line and a contour with a second accelerator voltage in a second portion of the scan line.

In an alternative embodiment the first and second accelerator voltages are used intermittently, i.e., a first accelerator voltage is first used a first predetermined period of time and then a second accelerator voltage is used a predetermined period of time. The electron beam may be switched off during the time the electron beam is reposition from the area where the first accelerator voltage was used to the area where the second accelerator voltage is to be used. In such a manner a first and second process step, for instance a contour and an inner area, may be melted intermittently by using two different accelerator voltages. The on-off switching frequency may be constant or varied. The duty cycle of the electron beam may be constant or varied. In certain embodiments, the intermittent switching may be between two stages of the formation of the three-dimensional article, wherein both stages may be within a single process step (e.g., preheating, or the like).

In another aspect of the invention it is provided a program element configured and arranged when executed on a computer to implement a method for forming a three-dimensional article through successively depositing individual layers of powder material that are fused together so as to form the article, the method comprising the steps of: providing at least one electron beam source emitting an electron beam for heating and/or fusing the powder material, where the electron beam source comprising a cathode, an anode, and a grid between the cathode and anode, controlling the electron beam source in a first mode when the formation of the three dimensional article is in a first process step, controlling the electron beam source in a second mode when the formation of the three dimensional article is in a second process step, wherein an electron beam current from the electron beam source is controlled in a feed-forward mode in the first mode and the electron beam current is controlled in a feed-back mode in the second mode. The program may be installed in a computer readable storage medium. The computer readable storage medium may be the control unit 8, the control unit 150, or another separate and distinct control unit. The computer readable storage medium and the program element, which may comprise computer-readable program code portions embodied therein, may further be contained within a non-transitory computer program product. Further details regarding these features and configurations are provided, in turn, below.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

FIG. 8 is a block diagram of an exemplary system 1020 that can be used in conjunction with various embodiments of the present invention. In at least the illustrated embodiment, the system 1020 may include one or more central computing devices 1110, one or more distributed computing devices 1120, and one or more distributed handheld or mobile devices 1300, all configured in communication with a central server 1200 (or control unit) via one or more networks 1130. While FIG. 8 illustrates the various system entities as separate, standalone entities, the various embodiments are not limited to this particular architecture.

According to various embodiments of the present invention, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 1130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 1130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-1300 are illustrated in FIG. 8 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

Figure 9A:
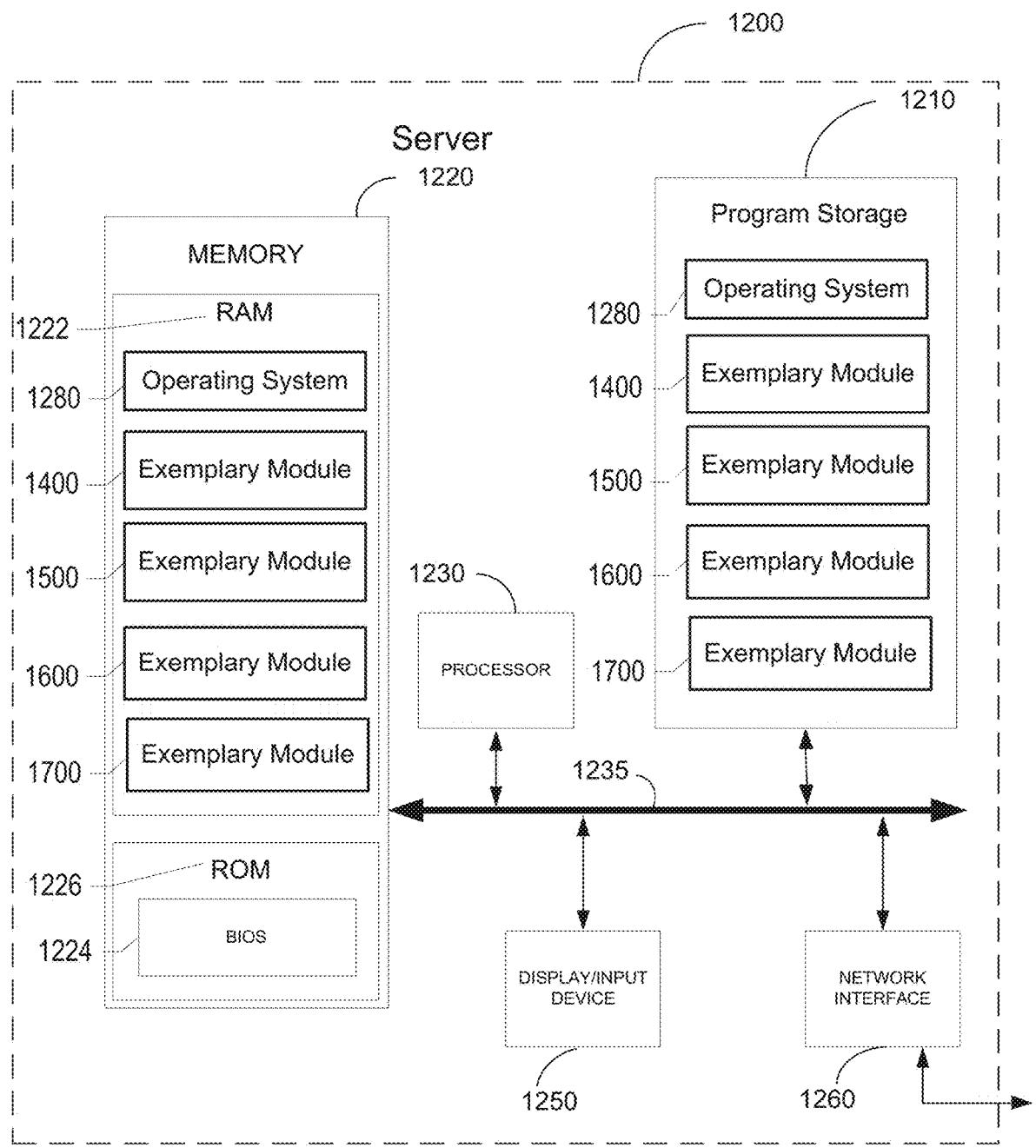
FIG. 9A is a schematic block diagram of a server 1200 according to various embodiments.

FIG. 9A is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which preferably includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1020. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

As will be understood, the processing element 305 may be embodied in a number of different ways. For example, the processing element or processor may be embodied as one or more complex programmable logic devices (CPLDs), microprocessors, multi-core processors, coprocessing entities, application-specific instruction-set processors (ASIPs), and/or controllers. Further, the processing element may be embodied as one or more other processing devices or circuitry. The term circuitry may refer to an entirely hardware embodiment or a combination of hardware and computer program products. Thus, the processing element may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element may be configured for a particular use or configured to execute instructions stored in volatile or non-volatile media or otherwise accessible to the processing element. As such, whether configured by hardware or computer program products, or by a combination thereof, the processing element may be capable of performing steps or operations according to embodiments of the present invention when configured accordingly.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 1200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Figure 9B:
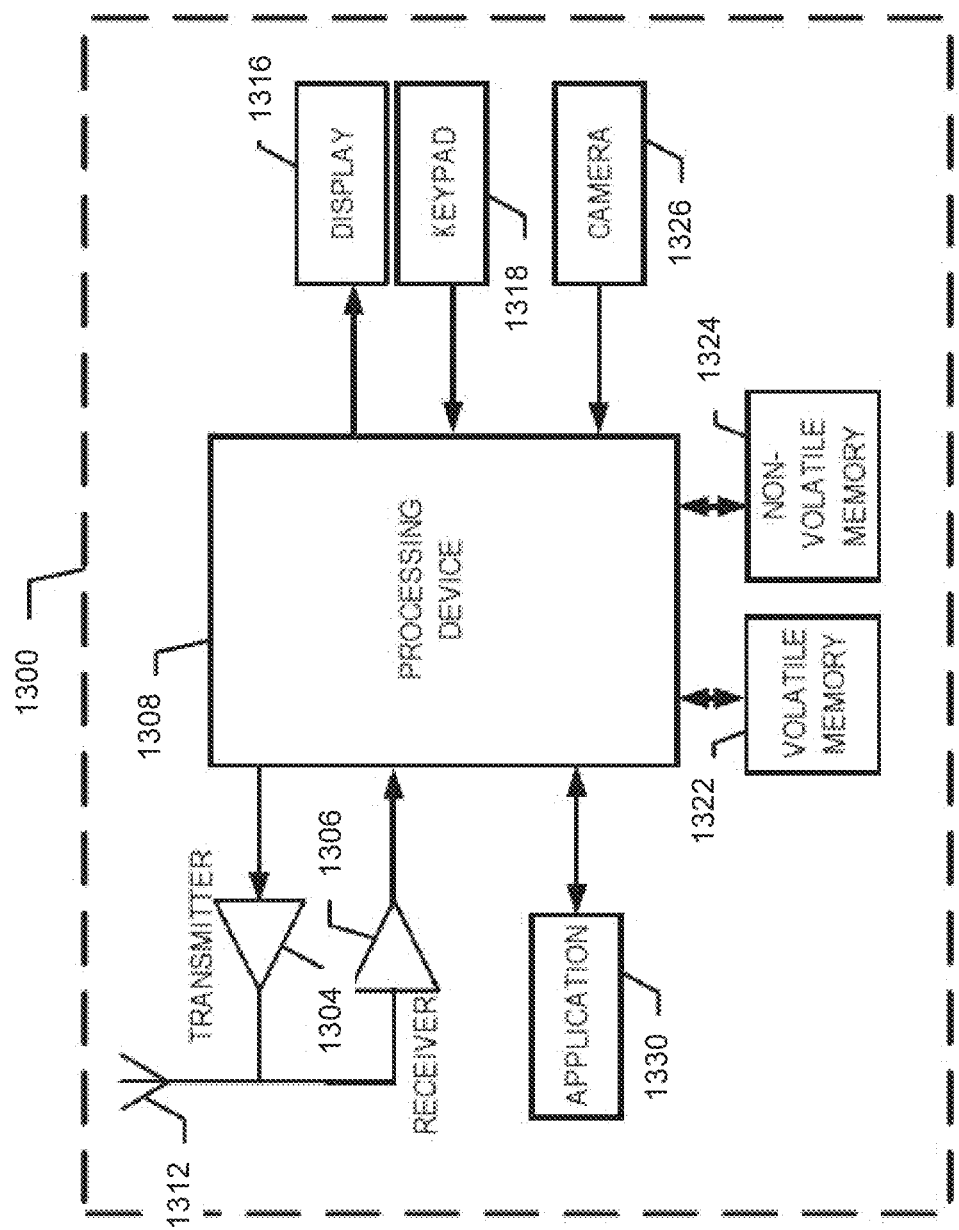
FIG. 9B is a schematic block diagram of an exemplary mobile device 1300 according to various embodiments.

FIG. 9B provides an illustrative schematic representative of a mobile device 1300 that can be used in conjunction with various embodiments of the present invention. Mobile devices 1300 can be operated by various parties. As shown in FIG. 9B, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 1300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 308). The user input interface can comprise any of a number of devices allowing the mobile device 1300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1020 as a whole.

It will be appreciated that many variations of the above systems and methods are possible, and that deviation from the above embodiments are possible, but yet within the scope of the claims. Many modifications and other embodiments of the invention set forth herein will come to mind to one skilled in the art to which these inventions pertain having the benefit of the teachings presented in the foregoing descriptions and the associated drawings. Such modifications may, for example, include first and second process steps having accelerator voltage ranges overlapping each other. Although the ranges are partially overlapping each other the first and second accelerator voltages for the first and second process steps respectively may still be chosen to differ more than a predetermined value of accelerator voltage from each other. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for forming a three-dimensional article through successively depositing and fusing individual layers of powder so as to form the article, the apparatus comprising:
    at least one electron beam source emitting an electron beam for at least one of heating or fusing the powder material, wherein the electron beam source comprises a cathode and an anode, and
    at least one control unit, the at least one control unit configured for:
        varying an accelerator voltage between the cathode and the anode between at least a first and a second predetermined value during the forming of the three-dimensional article,
        applying the first predetermined value of the accelerator voltage between the cathode and the anode when the formation of the three dimensional article is in a first stage, and
        applying the second predetermined value of the accelerator voltage between the cathode and the anode when the formation of the three dimensional article is in a second stage, wherein the predetermined first value of the accelerator voltage differs from the second predetermined value of the accelerator voltage by at least 10 kV.

2. The apparatus according to claim 1, wherein:
    the electron beam source further comprises a grid; and
    the grid voltage is synchronously varied with the accelerator voltage between the cathode and the anode, as such is varied between at least the first and the second predetermined value during the forming of the three-dimensional article.

3. The apparatus according to claim 1, wherein:
    the at least one electron beam source comprises a first electron beam source and a second electron beam source;

the first accelerator voltage emanates from the first electron beam source; and the second accelerator voltage emanates from the second electron beam source.

4. The apparatus according to claim 3, wherein:

the first accelerator voltage emanates from the first electron beam source for a first predetermined period of time;

the second accelerator voltage emanates from the second electron beam source for a second predetermined period of time; and the first and second predetermined periods of time are non-overlapping.

5. The apparatus according to claim 4, wherein:

the first predetermined accelerator voltage is provided at a first position during the first predetermined period of time;

the second predetermined accelerator voltage is provided at a second position during the second predetermined period of time; and the electron beams are switched on and off at least once at each of the first and second positions.

6. The apparatus according to claim 1, wherein the first predetermined value of the accelerator voltage differs from the second predetermined value of the accelerator voltage by at least 25 kV.

7. The apparatus according to claim 1, wherein the first stage is a first process step and the second stage is a second process step.

8. The apparatus according to claim 7, wherein the first process step is used for fusion of inner areas of the three-dimensional article and the second process step is used for fusion of a contour of the three-dimensional article.

9. The apparatus according to claim 7, wherein the first process step is used for forming solid structures and the second process step is used for net structures.

10. The apparatus according to claim 7, wherein the first process step is used for a first type of microstructures and the second process step is used for a second type of microstructures.

11. The apparatus according to claim 7, wherein the first process step is used for a central melting spot and the second process step is used for at least one surrounding heating spot.

12. The apparatus according to claim 7, wherein the first process step is used for a central melting spot and the second process step is used for a concentric heating spot.

13. The apparatus according to claim 7, wherein the first process step is used for a central melting spot and the second process step is used for an at least partially overlapping heating spot.

14. The apparatus according to claim 1, wherein the first stage is at least one portion of a first process step used for preheating of unfused powder and the second stage is at least one other portion of the first process step used for preheating of unfused powder.

15. The apparatus according to claim 14, wherein a switching frequency between the first and the second predetermined values of the accelerator voltage is variable as a function of scanning speed.

16. The apparatus according to claim 1, wherein the first predetermined value of the accelerator voltage differs from the second predetermined value of the accelerator voltage by at least 50 kV.

17. The apparatus according to claim 1, wherein at least one scan line comprises the first and second predetermined accelerator voltages.

18. The apparatus according to claim 1, wherein the first predetermined value of the accelerator voltage is less than 2 kV.

19. The apparatus according to claim 18, wherein the first stage is a first process step used for a central melting spot and the second stage is a second process step used for a concentric heating spot.

20. The apparatus according to claim 18, wherein the first stage is a first process step used for a central melting spot and the second stage is a second process step used for an at least partially overlapping heating spot.

* * * * *

UNITED STATES PATENT AND TRADEMARK OFFICE
CERTIFICATE OF CORRECTION

Page 1 of 1

PATENT NO. : 11,623,282 B2
APPLICATION NO. : 16/797159
DATED : April 11, 2023
INVENTOR(S) : Johan Nordkvist and Ulf Ackelid It is certified that error appears in the above-identified patent and that said Letters Patent is hereby corrected as shown below:

On the Title Page

In page 2, Column 2, item (56), U.S. patent documents, cite no. 67, delete "Fun et al." and insert --Yun et al.--.

Signed and Sealed this
Sixth Day of June, 2023

Katherine Kelly Vidal
*Director of the United States Patent and Trademark Office*